Aug. 17, 1965   O. THOMA ETAL   3,200,760
HYDRAULIC APPARATUS
Filed Jan. 7, 1963
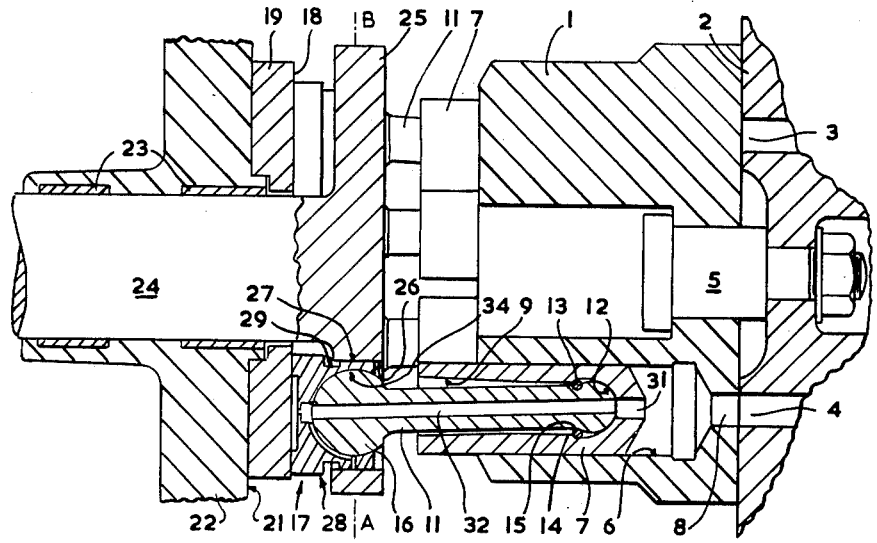
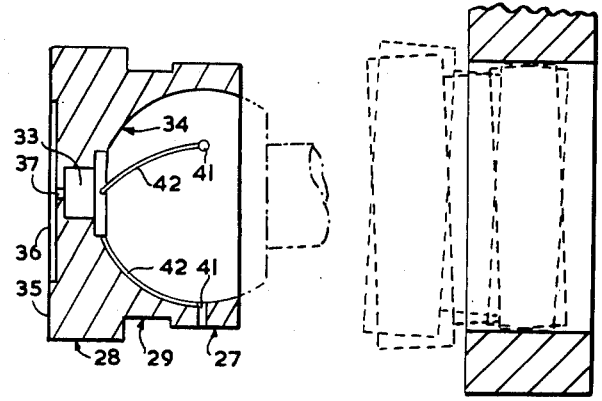
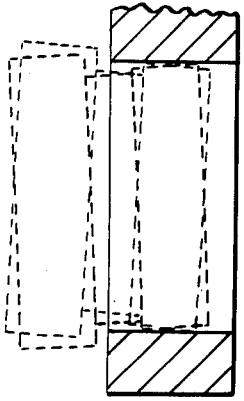
INVENTORS
OSWALD THOMA &
THOMAS D. H. ANDREWS
By Reynolds & Christensen
ATTORNEYS United States Patent Office 3,200,760
Patented Aug. 17, 1965

3,200,760
HYDRAULIC APPARATUS
Oswald Thoma and Thomas D. H. Andrews, Cheltenham, England, assignors to Dowty Hydraulic Units Limited, Ashchurch, England, a British company, and Unipat A.G., Glarus, Switzerland, a Swiss company
Filed Jan. 7, 1963, Ser. No. 249,855
Claims priority, application Great Britain, Jan. 16, 1962, 1,577/62; July 18, 1962, 27,617/62
9 Claims. (Cl. 103—162)

This invention relates to slipper bearings for use in conjunction with a cam or equivalent surface to produce a reciprocating movement with substantial thrust as a result of movement of the slipper over the cam surface or vice versa. Such slipper bearings are used in swash plate and tilting head pumps and motors to effect reciprocation of pistons in cylinders in synchronism with rotation of a cylinder block and a drive shaft.

The object of this invention is to improve the seating of such slippers on co-operating cam or equivalent surfaces and thus to increase the working life of the slippers and co-operating cam or equivalent surfaces.

The present invention comprises a slipper bearing mounted for sliding movement over the surface of a cam or the equivalent, or over which the surface of a cam is adapted to slide, a thrust member having an articulated connection with the slipper through which thrust from the slipper is applied to the thrust member, and a driving member for the slipper to drive it over the surface of the cam or the equivalent or to hold it against movement of the cam surface, said driving member engaging the slipper in such a way as to permit angular movement of the slipper to seat itself against the cam or equivalent surface.

The slipper may be in the form of a plunger engaged within a bore in the driving member, one end of the plunger engaging the cam or equivalent surface and the effective area of the engaging surface between the bore and the plunger being short in its axial dimension as compared with its diameter and being substantially aligned with the centre of articulation of the thrust member in the slipper whereby to permit slight angular movement of the slipper to seat itself accurately on the cam or equivalent surface but at the same time not to cause angular movement of the slipper. In this way the slipper will accommodate itself to irregularities or inaccuracies in the cam surface. The cam surface may be either substantially flat or substantially spherical in order that the slipper may seat on it.

The slipper may operate with a film of liquid between it and the cam surface this film being induced into position either hydrodynamically or hydrostatically.

One embodiment of the invention used in a tilting head pump will now be described with reference to the accompanying drawings in which:

FIGURE 1 is an axial sectional view through part of the tilting head pump,

FIGURE 2 is an enlarged cross sectional view of a slipper as used in FIGURE 1 and, FIGURE 3 is an enlarged view showing in dotted lines alternative slipper positions and illustrating the possible angular movement of the slipper.

Referring initially to FIGURE 1 the pump comprises a rotary cylinder block 1 rotatably carried on a valve plate 2 having a pair of kidney shaped ports 3 and 4. The kidney shape of these ports conventional, although it is not apparent in the drawing but would appear in a cross section through the valve plate perpendicular to the section of the drawing. The cylinder block 1 is located for rotation by means of a fixed shaft 5 extending centrally from the valve plate 2. Within the cylinder block 1 seven (or another appropriate number) equally spaced cylinders 6 are formed whose axes are parallel to the axis of block rotation. Within each cylinder 6 an elongated piston 7 is located for sliding movement. From the valve plate end of the cylinder block a port 8 extends from each cylinder 6 for co-operation with ports 3 and 4 in known manner during rotation of the cylinder block. A deep bore 9 extends within each piston 7 from the end thereof opposite the valve plate 2 and within this bore a connecting rod 11 is located. The connecting rod is capable of exerting thrust on the piston through a spherical seating 12 which permits of articulation of the connecting rod 11 relative to the piston 7. In order to retain the connecting rod 11 within the piston a circlip 13 engages a groove 14 around the interior bore 9 and a groove 15 around the connecting rod 11. The engagement of the circlip with the connecting rod is loose to permit of angular movement of the connecting rod within the bore 9.

The opposite end of the connecting rod 11 is formed with a ball joint 16 engaged within a slipper 17 the end surface of which in turn engages on the cam-like flat surface 18 of a thrust plate 19. This thrust plate is made of a wear resisting metal and loosely rests against a flat surface 21 of a bearing housing 22. The bearing housing 22 contains bearings 23 for the pump drive shaft 24. The drive shaft terminates internally of the pump at an integrally formed drive flange 25. Within the flange 25 seven (or the same number as there are cylinders) equally spaced bores 26 are formed. Each slipper 17 includes an exterior cylindrical surface 27 which fits with a small degree of clearance within a bore 26. Each slipper also includes a flange 28 located between the thrust plate 19 and the drive flange 25. This flange serves to prevent the slipper being pulled through the bore 26. Between the flange 28 and the cylindrical surface 27 a groove 29 is formed around the slipper the purpose of which is to ensure that the axial length of the cylindrical surface 27 is short compared with its diameter. By keeping the surface 27 comparatively short it is possible for a very small clearance of surface 27 within the bore 26 to permit the slipper to have a small but sufficient degree of angular movement within the bore 26 transverse to the geometric axis thereof. FIGURE 3 indicates in dotted lines extreme positions of the slipper 17 relative to the drive flange 25 in this transverse angular movement.

An axial passage 31 extends through each piston 7 and communicates with an axial passage 32 extending through each connecting rod 11 to the ball joint 16. Within the slipper 17 passage 32 communicates with a recess 33 and with the spherical seating 34 within the slipper. The surface 35 of the slipper which engages the surface 18 of the wear plate 19 includes a shallow circular recess 36. Centrally of the recess 36 a small hole 37 acting as a restrictor gives a restrictive interconnection from recess 33 to recess 36. Supply of hydraulic liquid at pressure is thus available from the cylinder 6 through passages 31 and 32, recess 33 and restrictor 37 to induce a film of liquid between the slipper surface 35 and the surface 18. The restrictor acts to reduce pressure in this film as a result of leakage flow over surface 35 so that the film pressure is automatically adjusted to balance the thrust on the slipper. This method of inducing the film of liquid is the hydrostatic method. Provided the design gives an adequate area to the surface 35 and recess 36 having regard to the force exerted by connecting rod 11 and the pressure of liquid available it can be ensured that the slipper engages the surface 18 substantially entirely through the medium of a pressurized liquid film whose pressure is automatically adjusted to balance the force exerted. It is within the scope of this invention to induce a film of bearing liquid hydrodynamically. This can be effected by arranging that the surface 18 and some or all of the slippers operate immersed in low pressure liquid and that the slipper surfaces 35 are slightly convex. Motion of the slippers over the surface 18 will then induce hydrodynamically a film of liquid between each slipper surface 35 and the surface 18.

If a slipper 17 is restricted against transverse angular movement it will be found that it cannot seat closely on the surface 18 because of the accuracy limits in machining surfaces 18 and 35. If the slipper cannot accommodate itself to the surface 18 and is maintained so that the surface 35 is slightly inclined to the surface 18 it will be clear that an adequate liquid film cannot be formed to balance the thrust of a connecting rod 11. Thus there will be the danger of metal to metal contact between the surfaces 18 and 35. This would reduce the working life of the slippers 17 and the thrust plate 19 by permitting excessive wear.

By permitting the slippers 17 in accordance with the invention to have a slight degree of transverse angular motion within the bores 26 it is possible to ensure that the slippers are self accommodating to the surface 18 and always tend to take up a position where the slipper surfaces 35 are parallel to the surface 18 but are separated by a film of liquid.

In operation of the pump as shown rotation of the drive shaft 24 will cause rotation of the drive flange 25 which in turn will drive the slippers 17 and ball joints 16 of the connecting rods. Such rotation will cause slight inclination of the connecting rods 11 within their pistons 7 until one connecting rod contacts the side of its bore 9 to apply rotational drive to the cylinder block 1. The rotational drive of the cylinder block 1, in the form herein illustrated, will depend on successive engagements between connecting rod and piston bore of successive pistons during rotation. The valve plate 2, as is conventional in such pumps and motors, is pivotally carried by a support (not shown) having pivots located on the axis A–B of FIGURE 1. This axis extends through the diameter of the circle on which the centres of the ball joints 16 are located. In FIGURE 1 the axis of the shaft 24 coincides with the axis of the cylinder block 1 and rotation of the shaft 24 will cause rotation of the cylinder block 1 without causing reciprocation of pistons 7 within cylinder 6. In order to cause pumping action valve plate 2 and cylinder block 1 are tilted on their supports about the axis A–B, until the two axes are relatively angularly related. Rotation of the drive shaft 24 will then cause reciprocation of piston 7 within cylinder 6 and liquid will be drawn into one of the ports 3 or 4 and discharged at pressure through the other port. In normal operation the pump illustrated is arranged to have low pressure liquid supplied to it so that during any operation all the cylinders 6 will contain liquid either at low pressure or at high pressure. The action of pressure within cylinders 6 will ensure that a force acts in each connecting rod 11 to urge the slipper 17 against the surface 18.

It is desirable as far as possible that during operation of the pump the force exerted by the drive flange 25 on the slippers 17 should not be such as to impose any tipping forces on the slippers which would cause angular movement to tilt the surfaces 35 relatively to the surface 18. In order to keep such tipping forces to a minimum the axial length of the cylindrical surface 27 of each slipper is symmetrically arranged having regard to the centre of the ball joint 16.

In order to improve freedom of angular movement between the cylindrical surface 27 of each slipper and its enclosing bore 26, lubrication passages are provided. As is shown more particularly in FIGURE 2 three lubricating passages 41 are provided extending from this spherical seat 34 to the cylindrical surface 27. Liquid from the recess 33 may obtain access to the passages 41 either by leakage between the ball 16 and the seating 34 or by the provision of shallow grooves 42 in the seat 34 from the recess 33 to the passages 41. When the pump as described is operated it is found that the surfaces 27 of the slipper acquire a spherical or barrel like shape after considerable use. This occurs even though the surface 18 is accurately perpendicular to the drive shaft axis and the bores 26 are accurately parallel to the drive shaft axis within normal machining tolerances. At the same time there is negligible wear on the surfaces 18 and 35. This shows the desirability of permitting angular tipping of the slippers.

In the illustrated example the surface 27 of each slipper has been shown as a cylindrical surface. It is, however, within the scope of this invention to form this surface as a part spherical surface whose centre is the centre of the seating 34. There may be provided inbetween the surface 27 and the bore 26 a compensating member having a spherical inner surface to engage the spherical surface 27 and a cylindrical outer surface to engage the bore 26. This arrangement will permit transverse angular movement of the slipper 17, and longitudinal movement within the bore 26 so that each slipper 17 may settle accurately on the co-operating surface 18 and an effective liquid film be established.

Whilst the described example of the invention is incorporated within a tilting head pump it will be appreciated that there are many alternative kinds of hydraulic apparatus in which a slipper in accordance with the invention might be employed. For example the slipper of the invention may be used in swash-plate pumps either of the rotating cylinder block or fixed cylinder block kinds having articulated connecting rods extending from the pistons. Whilst it is generally desirable for slipper bearings according to the invention to employ a liquid to lubricate the co-operating slipper and cam surfaces it will be appreciated that it is within the scope of the invention to use a dry lubricant. For example either the cam surface or the slipper surface engaging the cam may be coated with a dry lubricating coating incorporating graphite or other dry lubricant.

We claim as our invention:

1. A bearing combination comprising a slipper having a cylindrical surface of slight axial extent and a bearing surface transverse to its cylindrical surface, a drive shaft rotatable about a first axis, a driving member integral with the drive shaft and formed with a bore wherein the cylindrical surface of the slipper is closely received and axially movable, but with only sufficient clearance to tilt slightly by reason of its slight axial extent, a cam member having a bearing surface complemental to the slipper's bearing surface, disposed substantially perpendicularly to said first rotation axis, and parallel to the plane of rotation of the driving member, and a thrust member rotatable bodily about a second axis which during operation intersects the first axis, and joined to said slipper by an articulated joint the center of which coincides substantially with the center of said cylindrical surface to urge the slipper generally axially onto the bearing surface of the cam member.

2. A bearing combination comprising a slipper formed as a plunger and having a bearing surface, a cam having a complemental bearing surface, a thrust member, an articulated joint joining said thrust member and slipper, a driving member formed with a bore wherein the plunger fits, in constant contact with the bore but with freedom for limited axial movement within the bore, drive means integral with the driving member to produce relative driving movement between the driving member and the cam whereby the slipper's bearing surface slides relatively to the cam's bearing surface, the effective area of the surfaces engaging between the plunger and its bore being short in its axial dimension as compared with its diameter and being substantially aligned with and symmetrically disposed with relation to the center of articulation of the articulated joint, whereby thrust exerted by the thrust member will cause slight angular tipping of the slipper to seat itself truly on a non-true cam bearing surface and whereby driving force exerted by the driving member can not cause angular tipping of the slipper.

3. A bearing combination as in claim 2 including a hydraulic pressure chamber defined by the cam's bearing surface and a recess in the slipper's bearing surface, and hydraulic supply means for the pressure chamber.

4. A hydraulic pump or motor comprising a plurality of slippers each having a cylindrical surface of slight axial extent and a bearing surface transverse to its cylindrical surface, a driving member rotatable about a first axis and formed with bores distributed about such axis of a size to receive closely the cylindrical surface of the respective slippers, each for axial movement but with only sufficient clearance to tilt slightly by reason of its slight axial extent, a cam member having a bearing surface complemental to the bearing surfaces of the several slippers, disposed substantially perpendicularly to the first rotation axis, and parallel to the plane of rotation of the driving member, a cylinder block rotative about a second axis intersecting and in operation inclined with respect to the first axis, cylinders formed in said block, one corresponding to each slipper, a piston reciprocable in each cylinder, a connecting rod articulated with respect to and extending from within each piston, and with respect to the corresponding slipper, whereby the rotation of the driving member communicated to the slippers will effect rotation of the cylinder block through said connecting rods and pistons, the driving engagement between each slipper and the driving member being directed through the center of the articulated connection between such slipper and its connecting rod to permit angular tipping movement of each slipper with respect to the driving member but independently of the rotative force of the driving member about the first axis, so that each slipper may seat itself truly against the cam bearing surface regardless of irregularities therein, when thrust is exerted on the slipper through its connecting rod.

5. A hydraulic pump or motor comprising a rotary cylinder block formed with cylinders axially directed and distributed about its rotary axis, a piston reciprocable in each cylinder, a connecting rod articulated with respect to and extending from each piston, a slipper having a bearing surface and articulatingly connected to the free end of each connecting rod to receive thrust from the latter, a cam having a bearing surface against which the bearing surface of each slipper bears under the influence of such thrust, a rotary flange rotative in a plane parallel to the cam's bearing surface and formed with bores directed axially, one for each slipper, each slipper having a cylindrical surface engaged within its bore to be thereby rotated by the rotary flange, the axial length of each such cylindrical surface being small compared with the diameter thereof to permit angular tipping movement of each slipper to bear truly during rotation upon the cam's bearing surface despite irregularities in the latter, the axial length of each such cylindrical surface being symmetrically disposed relative to the center of articulation of the associated connecting rod in the slipper, whereby rotative force exerted by the connecting rod and reacted by the slipper can cause no substantial tipping force to be exerted on the slipper, and means to ensure conjoint rotation of said rotary flange and said cylinder block and reciprocation of the pistons in their cylinders.

6. A hydraulic pump or motor as claimed in claim 5 including for each slipper a pressure chamber defined by the cam bearing surface and a recess in the slipper bearing surface, a hydraulic supply source, a hydraulic flow passage from the hydraulic supply source for the pressure chamber, and a hydraulic flow passage from the supply source to the cylindrical surface of the slipper.

7. A pump or motor as claimed in claim 6 wherein each articulated connection of a connecting rod is formed by co-operating spherical surfaces and the hydraulic supply source for each pressure chamber comprises a hydraulic flow passage from the associated piston through the connecting rod and the articulated joints.

8. A pump or motor as claimed in claim 7 wherein the interconnecting means to ensure conjoint rotation of the rotary driving flange and the cylinder block comprises stop means associated with each piston to limit angular articulation movement of the associated connecting rod.

9. A pump or motor as claimed in claim 7 including a drive shaft integrally formed with the drive flange and bearings carrying the drive shaft such that rotation of the drive flange takes place in a plane parallel to the cam bearing surface.

References Cited by the Examiner

UNITED STATES PATENTS

| 2,155,455 | 4/39  | Thoma          | 103—162 |
| 2,608,159 | 8/52  | Born           | 103—162 |
| 2,699,123 | 1/55  | Bonnette et al.| 103—162 |
| 3,020,847 | 2/62  | Roheberg       | 103—173 |
| 3,056,358 | 10/62 | Pedersen et al.| 103—162 |

FOREIGN PATENTS

| 1,114,641 | 12/55 | France. |
| 722,864   | 2/55  | Great Britain. |

LAURENCE V. EFNER, *Primary Examiner.*

JOSEPH H. BRANSON, JR., *Examiner.*